(12) United States Patent
Segawa

(10) Patent No.: US 11,453,372 B2
(45) Date of Patent: Sep. 27, 2022

(54) BRAKE APPARATUS, BRAKE CONTROL METHOD, AND METHOD FOR DETERMINING LOCK ABNORMALITY IN MOTOR

(71) Applicant: HITACHI AUTOMOTIVE SYSTEMS, LTD., Hitachinaka (JP)

(72) Inventor: Masanori Segawa, Machida (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 410 days.

(21) Appl. No.: 16/083,862

(22) PCT Filed: Sep. 13, 2016

(86) PCT No.: PCT/JP2016/076886
§ 371 (c)(1),
(2) Date: Sep. 10, 2018

(87) PCT Pub. No.: WO2017/158884
PCT Pub. Date: Sep. 21, 2017

(65) Prior Publication Data
US 2019/0061724 A1 Feb. 28, 2019

(30) Foreign Application Priority Data

Mar. 18, 2016 (JP) .............................. JP2016-055818

(51) Int. Cl.
*B60T 8/94* (2006.01)
*B60T 7/12* (2006.01)
(Continued)

(52) U.S. Cl.
CPC ................. *B60T 8/94* (2013.01); *B60T 7/12* (2013.01); *B60T 8/17* (2013.01); *B60T 8/40* (2013.01);
(Continued)

(58) Field of Classification Search
None
See application file for complete search history.

(56) References Cited

U.S. PATENT DOCUMENTS

2007/0210648 A1* 9/2007 Sato ...................... B60T 13/161
303/155
2011/0316329 A1* 12/2011 Nishino ................ B60T 8/4872
303/14
(Continued)

FOREIGN PATENT DOCUMENTS

JP 08-301097 A 11/1996
JP 2001-268782 A 9/2001
(Continued)

*Primary Examiner* — Aniss Chad
*Assistant Examiner* — Mahmoud M Kazimi
(74) *Attorney, Agent, or Firm* — Foley & Lardner LLP

(57) ABSTRACT

Provided is a brake apparatus, a brake control method, and a method for determining a lock abnormality in a motor capable of reducing motor drive noise at the time of a self-diagnosis of the motor regardless of a condition. A brake control method includes issuing a drive instruction to repeat ON/OFF driving a plurality of times and drive a motor in such a manner that a rotational frequency of the motor during an OFF time period does not fall to zero and a peak of the rotational frequency of the motor during an ON time period increases as the ON/OFF driving is repeated, carrying out terminal voltage detection to detect a terminal voltage of the motor at the time of the ON/OFF driving carried out by the issuing of the drive instruction, and determining a lock abnormality in the motor to determine whether there is the lock abnormality in the motor based on a characteristic of the terminal voltage during the OFF time period of the ON/OFF driving that is detected by the carrying out of the terminal voltage detection.

17 Claims, 11 Drawing Sheets

(51) Int. Cl.
*B60T 8/40* (2006.01)
*B60T 8/88* (2006.01)
*B60T 8/90* (2006.01)
*B60T 13/14* (2006.01)
*B60T 13/66* (2006.01)
*B60T 13/68* (2006.01)
*B60T 17/00* (2006.01)
*B60T 17/02* (2006.01)
*H02H 7/093* (2006.01)
*B60T 17/22* (2006.01)
*B60T 8/17* (2006.01)
*B60T 8/48* (2006.01)
*H02H 7/08* (2006.01)

(52) U.S. Cl.
CPC ............... *B60T 8/885* (2013.01); *B60T 8/90* (2013.01); *B60T 13/146* (2013.01); *B60T 13/662* (2013.01); *B60T 13/686* (2013.01); *B60T 17/00* (2013.01); *B60T 17/02* (2013.01); *B60T 17/22* (2013.01); *B60T 17/221* (2013.01); *H02H 7/093* (2013.01); *B60T 8/4872* (2013.01); *B60T 13/665* (2013.01); *B60T 2270/406* (2013.01); *B60T 2270/414* (2013.01); *H02H 7/08* (2013.01)

(56) References Cited

U.S. PATENT DOCUMENTS

| | | | | |
|---|---|---|---|---|
| 2014/0142826 | A1* | 5/2014 | Harada | B60T 8/885 |
| | | | | 701/70 |
| 2015/0061362 | A1* | 3/2015 | Kikawa | B60T 8/4077 |
| | | | | 303/14 |
| 2015/0353067 | A1* | 12/2015 | Knechtges | B60T 13/745 |
| | | | | 303/3 |
| 2018/0194332 | A1* | 7/2018 | Watanabe | B60T 7/12 |
| 2020/0339096 | A1* | 10/2020 | Timm | B60T 13/686 |

FOREIGN PATENT DOCUMENTS

| | | |
|---|---|---|
| JP | 2005-132299 A | 5/2005 |
| JP | 2005132299 A * | 5/2005 |

* cited by examiner

BRAKE APPARATUS, BRAKE CONTROL METHOD, AND METHOD FOR DETERMINING LOCK ABNORMALITY IN MOTOR

TECHNICAL FIELD

The present invention relates to a brake apparatus, a brake control method, and a method for determining a lock abnormality in a motor.

BACKGROUND ART

PTL 1 discloses a method for determining whether there is a lock abnormality in a motor that drives a pump in a brake apparatus. This conventional technique drives the motor at a lower on-duty ratio than 100% for a predetermined time period, and, only when the lock abnormality is not determined to be absent at the time of an end of this driving, determines whether there is the lock abnormality by driving the motor at an on-duty ratio of 100%.

CITATION LIST

Patent Literature

PTL 1: Japanese Patent Application Public Disclosure No. 2001-268782

SUMMARY OF INVENTION

Technical Problem

However, the above-described conventional technique has a problem of being unable to reduce motor drive noise because the motor should be driven at the on-duty ratio of 100% for a predetermined time period when a voltage of a power source reduces or under a low-temperature environment.

An object of the present invention is to provide a brake apparatus, a brake control method, and a method for determining a lock abnormality in a motor capable of reducing the motor drive noise at the time of a self-diagnosis of the motor regardless of a condition.

Solution to Problem

According to one aspect of the present invention, a brake apparatus repeats ON/OFF driving a plurality of times and drives a motor in such a manner that a rotational frequency of the motor during an OFF time period does not fall to zero and a peak of the rotational frequency of the motor during an ON time period increases as the ON/OFF driving is repeated, and determines whether there is a lock abnormality in the motor based on a characteristic of a terminal voltage during the OFF time period of the ON/OFF driving.

Therefore, the present invention can reduce the motor drive noise at the time of the self-diagnosis of the motor regardless of the condition.

DESCRIPTION OF EMBODIMENTS

First Embodiment

Figure 1:
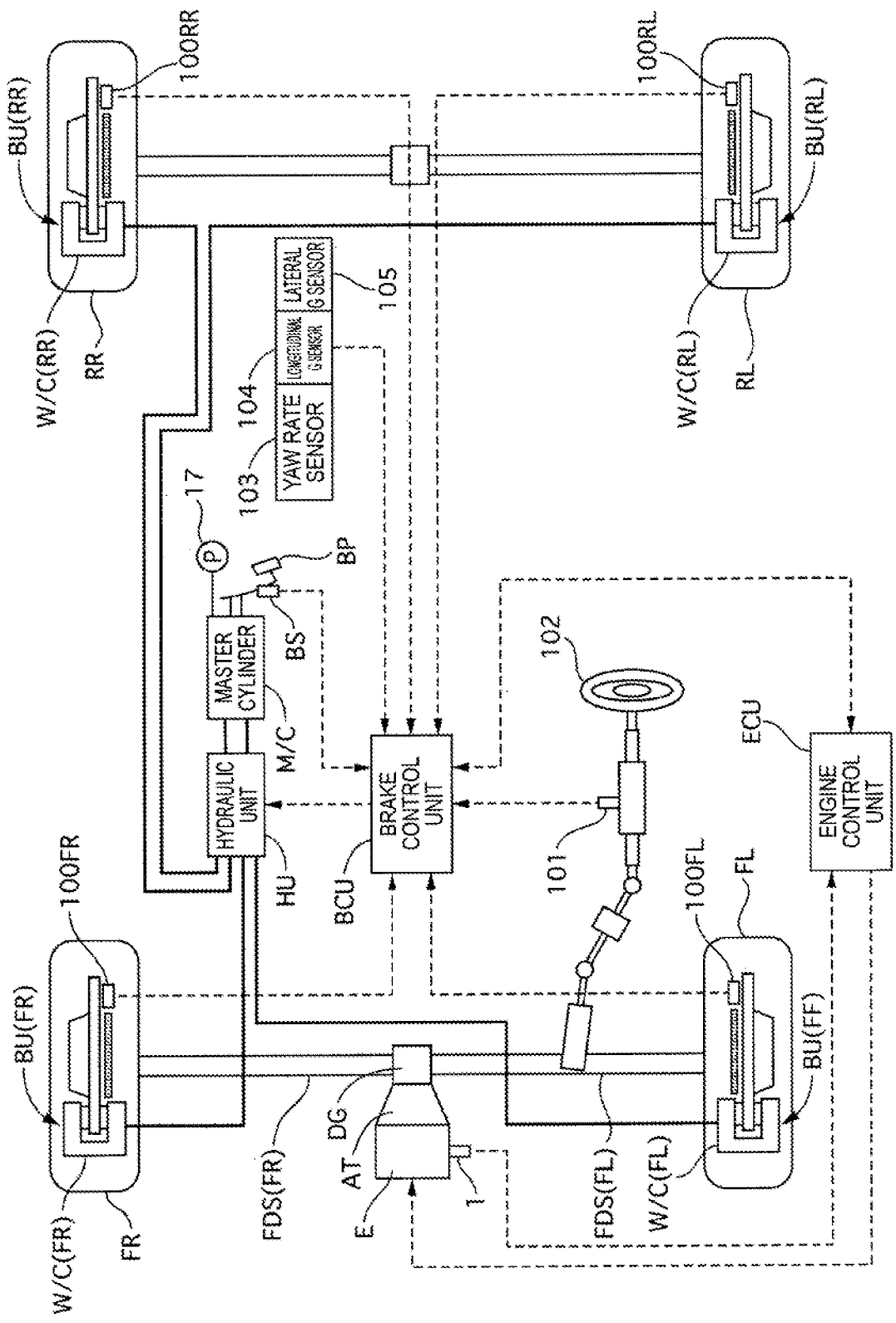
FIG. 1 is a system configuration diagram illustrating a braking/driving system of a vehicle with a brake apparatus according to a first embodiment employed therefor.

FIG. 1 is a system configuration diagram illustrating a braking/driving system of a vehicle with a brake apparatus according to a first embodiment employed therefor.

The brake apparatus according to the first embodiment is employed for an engine vehicle. The brake apparatus applies a frictional braking force with use of a hydraulic pressure to each of wheels (a front left wheel FL, a front right wheel FR, a rear left wheel RL, and a rear right wheel RR) of the vehicle. A brake actuation unit BU is mounted at each of the wheels FR to RR. The brake actuation unit BU is a braking force generation portion including a wheel cylinder W/C. The brake actuation unit BU is, for example, a disk-type brake, and includes a caliper (a hydraulic brake caliper). The caliper includes a brake disk and brake pads. The brake disk is a brake rotor that rotates integrally with a tire. The brake pads are disposed with predetermined clearances generated from the brake disk, and contact the brake disk by being moved by a hydraulic pressure in the wheel cylinder W/C. The frictional braking force is generated by the contacts of the brake pads to the brake disk.

An engine E is coupled with each of front drive shafts FDS (FL) and FDS (FR) of the front left and right wheels FL and FR via an automatic transmission AT and a differential gear DG, and applies a drive force to each of the front left and right wheels FL and FR based on an instruction from an engine control unit ECU.

The engine control unit ECU controls a fuel injection amount and an ignition timing of the engine E based on an operation state such as a rotational speed of the engine from an engine rotational speed sensor 99, an amount of intake air, a temperature of cooling water, and a position of a throttle valve (a throttle position).

A brake control unit (a control unit) BCU transmits an instruction to a hydraulic unit HU based on a master cylinder hydraulic pressure from a pressure sensor 17 that detects the master cylinder hydraulic pressure, each of wheel speeds from respective wheel speed sensors 100FL, 100FR, 100RL, and 100RR provided at the individual wheels FL to RR, a steering angle of a steering wheel 102 from a steering angle sensor 101, a yaw rate from a yaw rate sensor 103, a longitudinal acceleration from a longitudinal G sensor 104, a lateral acceleration from a lateral G sensor 105, an operation signal of a brake pedal BP from a brake switch BS, and the like. The hydraulic unit HU increases/reduces or maintains the wheel cylinder hydraulic pressure in each of the brake actuation units BU according to the instruction from the brake control unit BCU.

Figure 2:
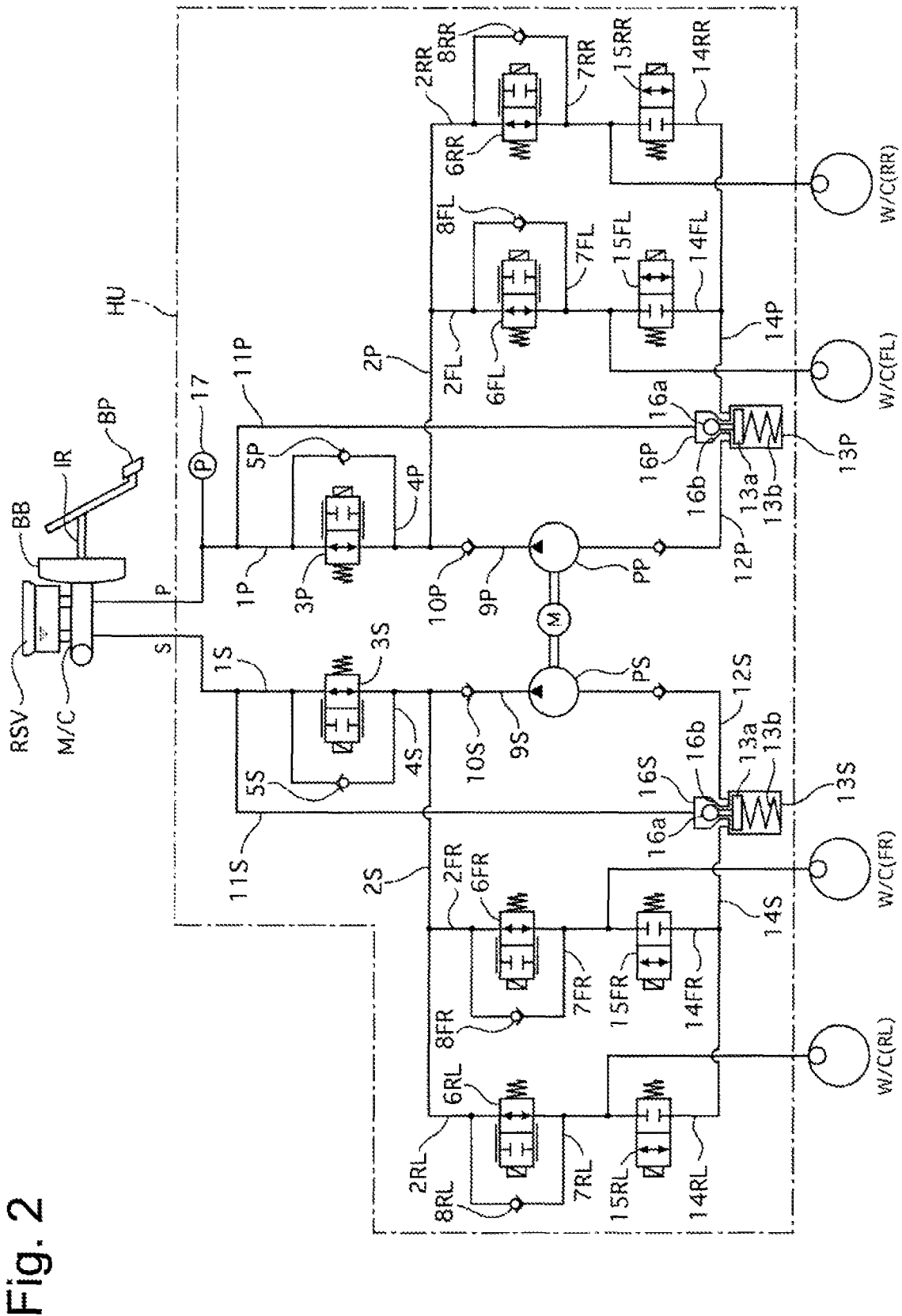
FIG. 2 illustrates a hydraulic circuit of the brake apparatus according to the first embodiment.

FIG. 2 illustrates a hydraulic circuit of the brake apparatus according to the first embodiment.

The brake apparatus according to the first embodiment includes two brake pipe systems (a primary P system and a secondary S system). A brake pipe configuration is, for example, an X-split pipe configuration. Hereinafter, when a component corresponding to the P system and a component corresponding to the S system are distinguished from each other, indexes P and S will be added at the ends of the respective reference numerals. When the component corresponding to the P system and the component corresponding to the S system are not distinguished from each other, the indexes P and S will be omitted. Further, when a component corresponding to the front left wheel FL, a component corresponding to the front right wheel FR, a component corresponding to the rear left wheel RL, and a component corresponding to the rear right wheel RR are distinguished from one another, indexes FL, FR, RL, and RR will be added at the ends of the respective reference numerals. When the component corresponding to the front left wheel FL, the component corresponding to the front right wheel FR, the component corresponding to the rear left wheel RL, and the component corresponding to the rear right wheel RR are not distinguished from one another, the indexes FL, FR, RL, and RR will be omitted. The brake apparatus applies the braking force to each of the wheels FL to RR by supplying brake fluid to each of the brake actuation units via brake pipes.

The brake pedal BP is connected to a master cylinder M/C via an input rod IR. A pedal pressing force input to the brake pedal BP is boosted by a brake booster BB. The brake booster BB boosts a brake operation force by utilizing an intake negative pressure generated by the engine. The master cylinder M/C is replenished with the brake fluid from a reservoir tank RSV, and generates the master cylinder hydraulic pressure according to an operation performed on the brake pedal BP. The master cylinder M/C and the wheel cylinders W/C are connected to each other via the hydraulic unit HU. The wheel cylinder W/C (FL) of the front left wheel FL and the wheel cylinder W/C (RR) of the rear right wheel RR are connected to the P system. The wheel cylinder W/C (RL) of the rear left wheel RL and the wheel cylinder W/C (FR) of the front right wheel FR are connected to the S system. Further, oil pumps (pumps) PP and PS are provided in the P system and the S system, respectively. The oil pumps PP and PS are drive by one motor M. The motor M is a rotary electric motor. The motor M is, for example, a brushed motor. The oil pumps PP and PS are, for example, plunger pumps.

Fluid passages 1 and fluid passages 2, which connect the master cylinder M/C and the wheel cylinders W/C to each other, are provided in the hydraulic unit HU. A fluid passage 23 branches into fluid passages 2RL and 2FR, and the fluid passages 2RL and 2FR are connected to the wheel cylinder W/C (RL) and the wheel cylinder W/C (FR), respectively. A fluid passage 2P branches into fluid passages 2FL and 2RR, and the fluid passages 2FL and 2RR are connected to the wheel cylinder W/C (FL) and the wheel cylinder W/C (RR), respectively. Gate-out valves (hereinafter referred to as G/V-OUTs) 3, which are normally-opened electromagnetic valves, are provided in the fluid passages 1. The pressure sensor 17, which detects the master cylinder hydraulic pressure, is provided at a position on a master cylinder side with respect to the G/V-OUT 3P in the fluid passage 1P of the P system. Fluid passages 4 are provided in the fluid passages 1 in parallel with the G/V-OUTs 3. Check valves 5 are provided in the fluid passages 4. Each of the check valves 5 permits the brake fluid to flow from the master cylinder M/C to the wheel cylinders W/C but prohibits the brake fluid from flowing in an opposite direction. Solenoid IN valves (hereinafter referred to as Sol/V-INs) 6, which are normally-opened electromagnetic valves corresponding to the individual wheel cylinders W/C, are provided in the fluid passages 2. Fluid passages 7 are provided in the fluid passages 2 in parallel with the Sol/V-INs 6. Check valves 8 are provided in the fluid passages 7. Each of the check valves 8 permits the brake fluid to flow from the wheel cylinder W/C to the master cylinder M/C but prohibits the brake fluid from flowing in an opposite direction.

Discharge sides of the oil pumps P and the fluid passages 2 are connected to each other via fluid passages 9. Discharge valves 10 are provided in the fluid passages 9. Each of the discharge valves 10 permits the brake fluid to flow from the oil pump P to the fluid passage 2 but prohibits the brake fluid from flowing in an opposite direction. Positions in the fluid passages 1 on the master cylinder side with respect to the G/V-OUTs 3, and intake sides of the oil pumps P are connected to each other via the fluid passages 11 and the fluid passages 12. Pressure adjustment reservoirs 13 are provided between the fluid passages 11 and the fluid passages 12. Positions in the fluid passages 2 on the wheel cylinder side with respect to the Sol/V-INs 6 and the pressure adjustment reservoirs 13 are connected to each other via fluid passages 14. Fluid passages 145 and 142 branch into fluid passages 14RL and 14FR, and fluid passages 14FL and 14RR, respectively, and then are connected to the corresponding wheel cylinders W/C. Solenoid OUT valves (hereinafter referred to as Sol/V-OUTs) 15, which are normally-closed electromagnetic valves, are provided in the fluid passages 14. The pressure adjustment reservoirs 13 each include a reservoir piston 13a, a reservoir spring 13b, and a check valve 16. The reservoir piston 13a is provided so as to be able to carry out a vertical stroke in the reservoir. The reservoir piston 13a is lowered and raised according to an increase and a reduction in a brake fluid amount flowing into the reservoir, respectively. The reservoir spring 13b biases the reservoir piston 13a in an upward direction. The check valve 16 includes a ball valve 16a and a valve seat 16b. The ball valve 16a is provided integrally with the reservoir piston. 13a, and is vertically moved according to the stroke of the reservoir piston 13a. The ball valve 16a is biased by a not-illustrated valve spring in a downward direction. An elastic force of the valve spring is set to a weaker force than an elastic force of the reservoir spring 13b. The valve seat 16b abuts against the ball valve 16a when the ball valve 16a is lowered.

The reservoir piston 13a is lowered against the biasing force of the reservoir spring 13b when the brake fluid flows in from the fluid passage 14. As a result, the brake fluid flows into the reservoir. The brake fluid flowing into the reservoir is supplied to the intake side of the oil pump P via the fluid passage 12. At this time, the ball valve 16a is also lowered according to the decent of the reservoir piston 13a, and is seated on (abuts against) the valve seat 16b due to the biasing force of the valve spring. As a result, the check valve 16 is brought into a closed state. Therefore, if the brake fluid flows into the pressure adjustment reservoir 13 by a larger amount than an intake capability of the oil pump P when the oil pump P is in operation, the check valve 16 is brought into the closed state and the brake fluid stops flowing in from the master cylinder side to the pressure adjustment reservoir 13. On the other hand, if the brake fluid flows into the pressure adjustment reservoir 13 by a smaller amount than the intake capability of the oil pump P when the oil pump P is in operation, a pressure in the fluid passage 12 reduces and therefore the reservoir piston 13a is raised. At this time, the ball valve 16a is also raised to be separated from the valve seat 16b according to the ascent of the reservoir piston 13a. As a result, the check valve 16 is brought into an opened state. Therefore, communication is established between the master cylinder side and the intake side of the oil pump P, so that the brake fluid flows in from the master cylinder side to the pressure adjustment reservoir 13. The check valve 16 is brought into the closed state when the fluid passage 11 has a high pressure exceeding a predetermined pressure, such as when the driver presses the brake pedal BP. Due to this configuration, the brake fluid does not flow from the master cylinder side to the pressure adjustment reservoir 13, and therefore the intake side of the oil pump P can be prevented from being subjected to the high pressure.

The brake control unit BCU performs anti-lock brake (ABS) control as brake control. The ABS control is control of, upon detecting that a wheel has a lock tendency while the driver operates the brake, repeatedly reducing, maintaining, and/or increasing the wheel cylinder hydraulic pressure so as to generate a maximum braking force while preventing the lock with respect to this wheel. At the time of ABS pressure reduction control, the brake control unit BCU reduces the wheel cylinder hydraulic pressure by closing the Sol/V-IN 6 and also opening the Sol/V-OUT 15 from the state illustrated in FIG. 2 (a state in which each of the valves is switched off) to thus release the brake fluid in the wheel cylinder W/C to the pressure adjustment reservoir 13. In ABS maintaining control, the brake control unit BCU maintains the wheel cylinder hydraulic pressure by closing both the Sol/V-IN 6 and the Sol/V-OUT 15. In ABS pressure increase control, the brake control unit BCU increases the wheel cylinder hydraulic pressure by controlling the Sol/V-IN 6 in a valve-opening direction and also closing the Sol/V-OUT 15 to thus supply the brake fluid from the master cylinder M/C to the wheel cylinder W/C.

Further, the brake control unit BCU can perform automatic brake control such as electronic stability control, brake assist control, and adaptive cruise control by actuating each of the valves and the oil pump P, as the brake control. The electronic stability control is control of achieving stabilization of a behavior of the vehicle by controlling the wheel cylinder hydraulic pressure of a predetermined control target wheel upon detecting that an oversteer tendency or an understeer tendency increases while the vehicle is turning. The brake assist control is control of generating, in the wheel cylinder W/C, a higher pressure than a pressure actually generated in the master cylinder M/C when the driver operates the brake. The adaptive cruise control is control of automatically generating the braking force according to a relative relationship to a preceding vehicle by automatic cruise control.

Figure 3:
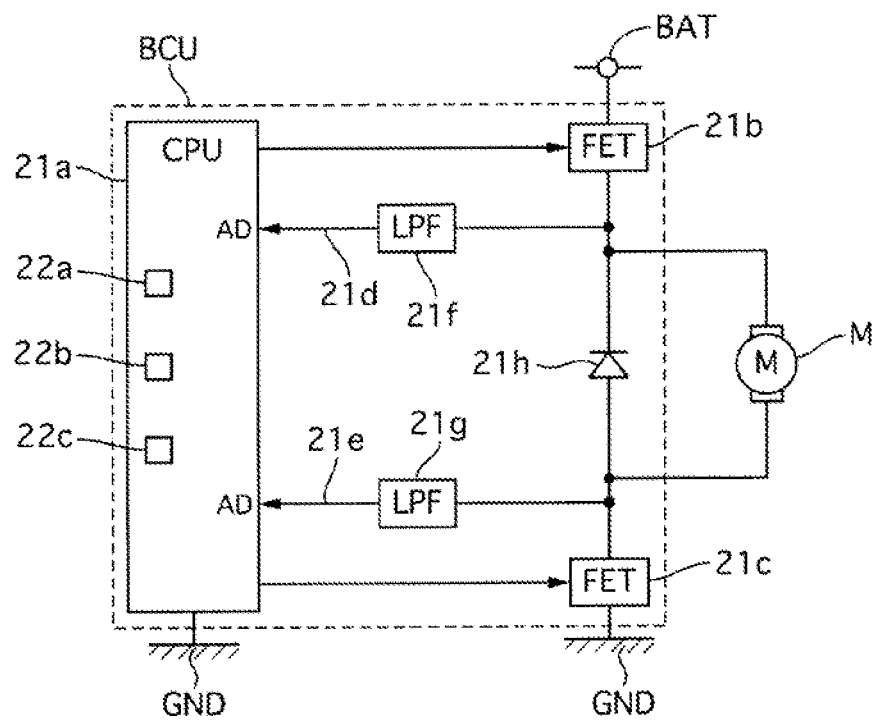
FIG. 3 illustrates a configuration of a motor drive circuit according to the first embodiment.

FIG. 3 illustrates a configuration of a motor drive circuit according to the first embodiment.

The brake control unit BCU includes a CPU 21a, a high-side motor drive FET 21b, a low-side motor drive FET 21c, a high-side voltage monitor 21d, a low-side voltage monitor 21e, a high-side low-pass filter 21f, a low-side low-pass filter 21g, and a return flow diode 21h. The CPU 21a calculates a target on-duty ratio of the motor M according to a program built therein, and outputs a motor drive signal according to the target on-duty ratio to the low-side motor drive FET 21c. The target on-duty ratio is an on-duty ratio of the motor N required to realize a target wheel cylinder hydraulic pressure in the brake control. Further, the CPU 21a constantly sets the high-side motor drive FET 21b to an ON state when the system operates normally, and prevents a motor malfunction or the like due to a failure by switching off the high-side motor drive FET 21b at the time of a failure or a system shutdown. The high-side motor drive FET 21b is provided between an in-vehicle battery BAT and a high-side terminal of the motor M, and functions as a failsafe relay. The low-side motor drive FET 21c is provided between a ground GND and a low-side terminal of the motor M, and connects the ground GND and the low-side terminal of the motor M when the motor drive signal is input (the motor drive signal is switched on) while disconnecting the ground GND and the low-side terminal of the motor M when the motor drive signal is not input (the motor drive signal is switched off). The high-side voltage monitor 21d detects a voltage of the high-side terminal of the motor M, and introduces a detection value into the CPU 21a. The low-side voltage monitor 21e detects a voltage of the low-side terminal of the motor M, and introduces a detection value into the CPU 21a. The high-side low-pass filter 21f removes noise from a signal input to the high-side voltage monitor 21d. The low-side low-pass filter 21g removes noise from a signal input to the low-side voltage monitor 21e. The return flow diode 21h is provided in parallel with the motor M. The return flow diode 21h rectifies a current when the low-side motor drive FET 21c is switched off, smooths a rotational frequency of the motor during PWM driving, and absorbs a surge generated when the low-side motor drive FET 21c is switched off, thereby reducing a load on the low-side motor drive FET 21c.

[Motor Lock Abnormality Determination Processing]

The CPU 21a of the brake control unit BCU performs motor lock abnormality determination processing like an example that will be described below, as a self-diagnosis of the rotor M to determine whether there is a lock abnormality in the motor M. The CPU 21a includes a drive instruction portion 22a, a terminal voltage detection portion 22b, and a motor lock abnormality determination portion 22c as a configuration for performing the motor lock abnormality determination processing.

Figure 4:
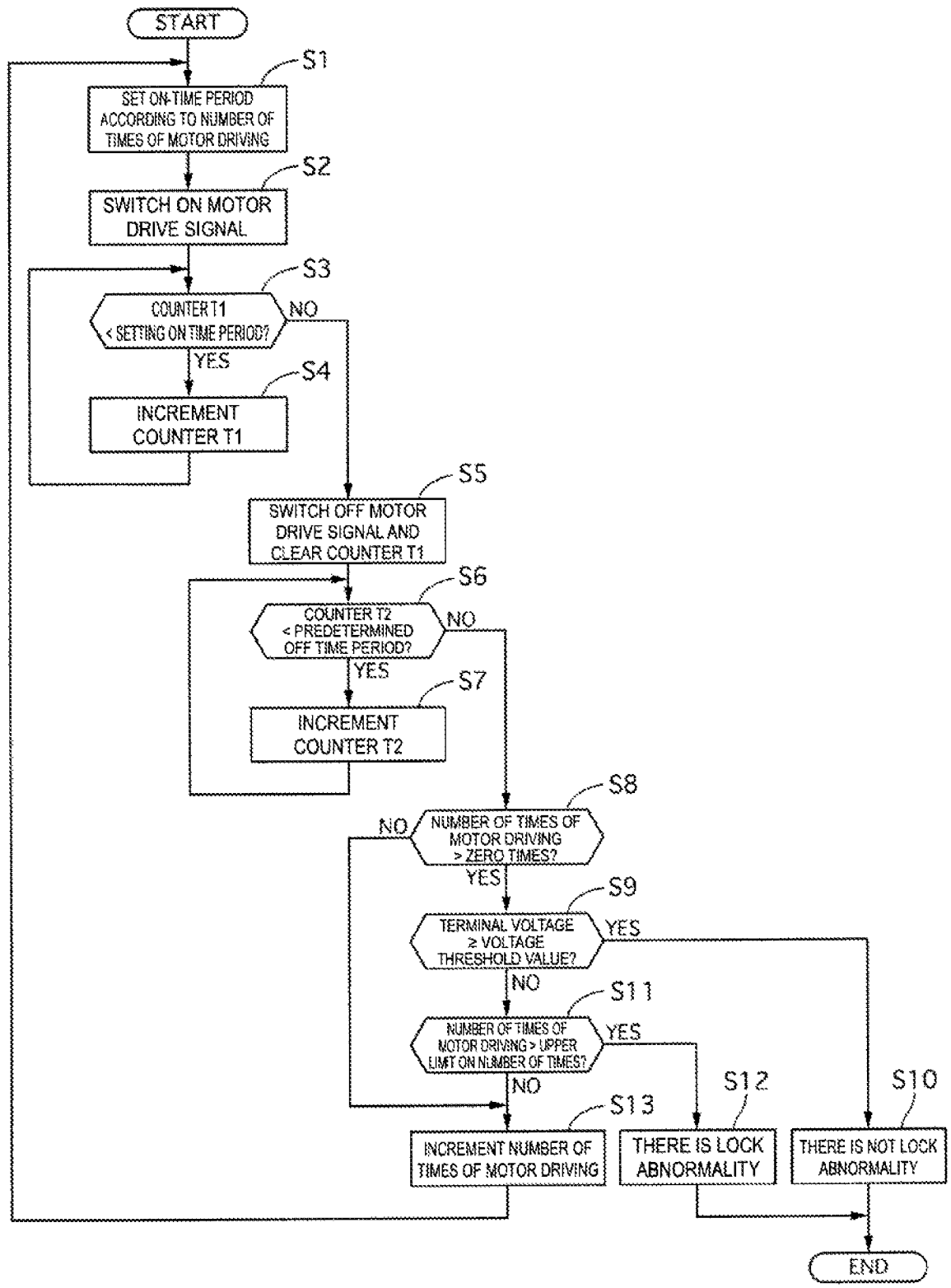
FIG. 4 is a flowchart illustrating a flow of motor lock abnormality determination processing according to the first embodiment.

FIG. 4 is a flowchart illustrating a flow of the motor lock abnormality determination processing according to the first embodiment.

In step S1, the motor lock abnormality determination portion 22c sets a setting ON time period according to the number of times of motor driving. Then, the processing proceeds to step S2. The setting ON time period is set to the same minimum time period (for example, 1 msec) when the number of times of motor driving is once or twice, and is set so as to increase as the number of times of motor driving increases when the number of times of motor driving is three times or more (for example, 2 msec for three times, 3 msec for four times, and 20 msec for five times). Now, the number of times of motor driving refers to the number of times of driving, regarding that the motor is driven once when the motor is subjected to ON/OFF driving that is a combination of switching on the motor drive signal and switching off the motor drive signal.

In step S2, the drive instruction portion 22a outputs the motor drive signal (switches on the motor drive signal). Then, the processing proceeds to step S3. The target on-duty ratio is set to 100%.

In step S3, the motor lock abnormality determination portion 22c determines whether a counter T1 is shorter than the setting ON time period set in step S1. If the determination in step S3 is YES, the processing proceeds to step S4. If the determination in step S3 is NO, the processing proceeds to step S5.

In step S4, the motor lock abnormality determination portion 22c increments the counter T1. Then, the processing returns to step S3.

In step S5, the drive instruction portion 22a stops the output of the motor drive signal (switches off the motor drive signal), and the motor lock abnormality determination portion 22c clears the counter T1. Then, the processing proceeds to step S6. Step S2 and step S5 are steps of issuing a drive instruction, which repeats the ON/OFF driving of the motor M a plurality of times and drives the motor M in such a manner that a peak of the rotational frequency of the motor increases as the ON/OFF driving is repeated.

In step S6, the motor lock abnormality determination portion 22c determines whether a counter T2 is shorter than a predetermined OFF time period. If the determination in step S6 is YES, the processing proceeds to step S7. If the determination in step S6 is NO, the processing proceeds to step S8. The predetermined OFF time period is set to a shorter time period (for example, 5 msec) than a time period since the normal motor N having no lock abnormality therein under an ordinary-temperature environment starts an inertia rotation during an OFF time period in the first ON/OFF driving until the rotational frequency of the motor falls to zero. The predetermined OFF time period is acquired in advance from an experiment or the like.

In step S7, the motor lock abnormality determination portion 22c increments the counter T2. Then, the processing returns to step S6.

In step S8, the CPU 21a determines whether the number of times of motor driving is larger than zero times. If the determination in step S8 is YES, the processing proceeds to step S9. If the determination in step S8 is NO, the processing returns to step S1.

In step S9, the terminal voltage detection portion 22b calculates the terminal voltage from an absolute value of a difference between the voltage of the high-side terminal and the voltage of the low-side terminal of the motor M, and the motor lock abnormality determination portion 22c determines whether the terminal voltage is equal to or higher than a lock check voltage threshold value. If the determination in step S9 is YES, the processing proceeds to step S10. If the determination in step S9 is NO, the processing proceeds to step S11. Step S9 is a step of carrying out terminal voltage detection, which detects the terminal voltage of the motor M at the time of the ON/OFF driving carried out in the step of issuing the drive instruction.

In step S10, the motor lock abnormality determination portion 22c determines that "there is not the lock abnormality". Then, the motor lock abnormality determination processing is ended.

In step S11, the motor lock abnormality determination portion 22c determines whether the number of times of motor driving is equal to or larger than an upper limit on the number of times (a predetermined number of times). If the determination in step S11 is YES, the processing proceeds to step S12. If the determination in step S11 is NO, the processing proceeds to step S13. The upper limit on the number of times is a plural number, and is set to a number of times that allows the brake apparatus to reliably determine whether there is the lock abnormality regardless of a variation such as individual variability of the motor M.

In step S12, the motor lock abnormality determination portion 22c determines that "there is the lock abnormality". Then, the motor lock abnormality determination processing is ended. Step S10 and step S12 are steps of determining a lock abnormality in the motor, which determines whether there is the lock abnormality based on a characteristic of the terminal voltage during the OFF time period of the ON/OFF driving that is detected in the step of carrying out the terminal voltage detection.

In step S13, the CPU 21a increments the number of times of motor driving. Then, the processing returns to step S1.

If determining that there is the lock abnormality by the motor lock abnormality determination processing, CPU 21a stores a history indicating the lock abnormality into a nonvolatile memory or the like, lights up a warning lamp, and prohibits the brake control.

Next, an operation of the motor lock abnormality determination processing according to the first embodiment will be described.

(Under Normal Condition)

Figure 5:
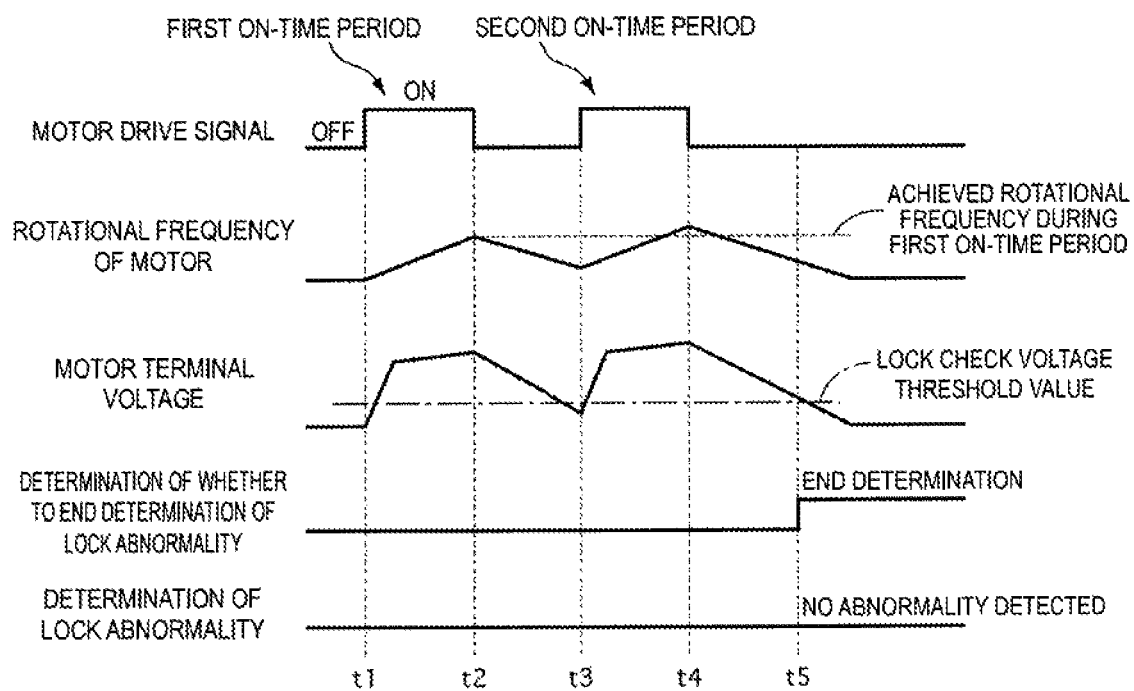
FIG. 5 is a timing chart illustrating an operation when a motor lock has not occurred in the motor lock abnormality determination processing according to the first embodiment.

FIG. 5 is a timing chart illustrating the operation when the motor lock has not occurred in the motor lock abnormality determination processing according to the first embodiment. The upper limit on the number of times of motor driving is set to three times.

At time t1, the CPU 21a starts the motor lock abnormality determination processing. The CPU 21a turns on the motor M (drives the motor M at, the on-duty ratio of 100%) to start the first ON/OFF driving. Since the motor M is normal (not locked), the rotational frequency of the motor also increases according to an increase in the terminal voltage during a time period from time t1 to time t2.

At time t2, the CPU 21a turns off the motor M (stops driving) because the setting ON time period has elapsed from time t1. The motor M starts the inertia rotation, and therefore a back electromotive force is generated. During a time period from time t2 to time t3, the terminal voltage also reduces according to the reduction in the rotational frequency of the motor.

At time t3, the predetermined OFF time period has elapsed from time t2, and the CPU 21a turns on the motor M to start the second ON/OFF driving because whether there is the motor lock abnormality is not determined during the OFF time period in the first ON/OFF driving. During a time period from time t3 to time t4, the rotational frequency of the motor also increases according to an increase in the terminal voltage.

At time t4, the CPU 21a turns off the motor M because the setting ON time period has elapsed from time t3. At this time, the peak of the rotational frequency of the motor (an achieved rotational frequency) is higher than the peak at the time of the first ON/OFF driving at time t2. During a time period from time t4 to time t5, the terminal voltage also reduces according to the reduction in the rotational frequency of the motor.

At time t5, the CPU 21a determines whether there is the motor lock abnormality by comparing the terminal voltage and the lock check voltage threshold value because the predetermined OFF time period has elapsed from time t4. At this time, the terminal voltage is higher than the lock check voltage threshold value, and therefore the CPU 21a determines that there is not the motor lock abnormality and thus ends the motor lock abnormality determination processing.

(Under Abnormal Condition)

Figure 6:
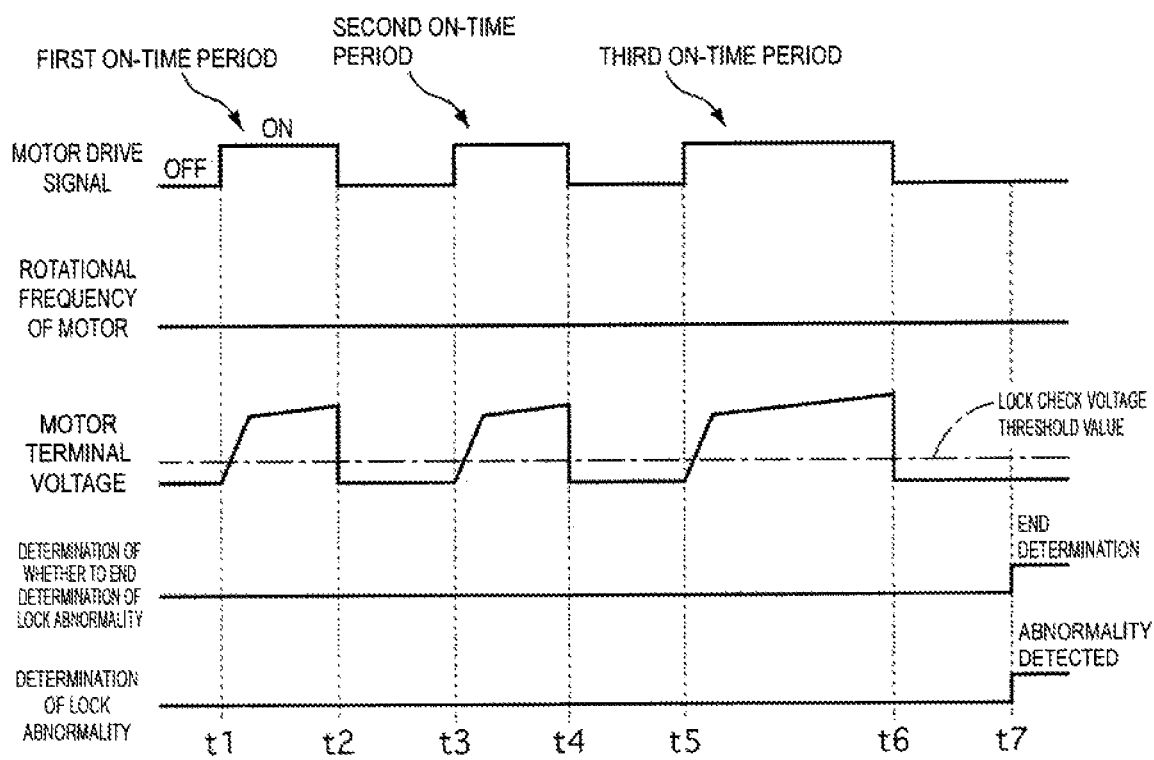
FIG. 6 is a timing chart illustrating an operation when the motor lock has occurred in the motor lock abnormality determination processing according to the first embodiment.

FIG. 6 is a timing chart illustrating the operation when the motor lock has occurred in the motor lock abnormality determination processing according to the first embodiment. The upper limit on the number of times of motor driving is set to three times.

At time t1, the CPU 21a starts the motor lock abnormality determination processing. The CPU 21a turns on the motor M to start the first ON/OFF driving. Since the motor M is locked, the rotational frequency of the motor remains zero despite the increase in the terminal voltage during the time period from time t1 to time t2.

At time t2, the CPU 21a turns off the motor M because the setting ON time period has elapsed from time t1. Since the motor M is locked, the terminal voltage falls to zero. During the time period from time t2 to time t3, both the terminal voltage and the rotational frequency of the motor are kept at zero.

At time t3, the predetermined OFF time period has elapsed from time t2, and the CPU 21a turns on the motor M to start the second ON/OFF driving because whether there is the motor lock abnormality is not determined during the OFF time period in the first ON/OFF driving. During the time period from time t3 to time t4, the rotational frequency of the motor remains zero while the terminal voltage increases.

At time t4, the CPU 21a turns off the motor M because the setting ON time period has elapsed from time t3. The terminal voltage fails to zero. During the time period from time t4 to time t5, both the terminal voltage and the rotational frequency of the motor are kept at zero.

At time t5, the CPU 21a determines whether there is the motor lock abnormality by comparing the terminal voltage and the lock check voltage threshold value because the predetermined OFF time period has elapsed from time t4. At this time, because the terminal voltage is lower than the look check voltage threshold value, the CPU 21a turns on the motor H to start the third ON/OFF driving. During the time period from time t5 to time t6, the rotational frequency of the motor remains zero while the terminal voltage increases.

At time t6, the CPU 21a turns off the motor M because the setting ON time period has elapsed from time t5. The terminal voltage falls to zero. During the time period from time t6 to time t7, both the terminal voltage and the rotational frequency of the motor are kept at zero.

At time t7, the CPU 21a determines whether there is the motor lock abnormality by comparing the terminal voltage and the look check voltage threshold value because the predetermined OFF time period has elapsed from time t6. At this time, the terminal voltage is lower than the lock check voltage threshold value and the number of times of motor driving reaches the upper limit on the number of times (three times), and thus the CPU 21a determines that there is the motor lock abnormality and ends the motor lock abnormality determination processing.

[Reduction in Drive Noise During Self-Diagnosis of Motor]

Conventionally, a brake apparatus unequipped with the sensor that detects the rotational frequency of the motor carries out the ON/OFF driving of the motor as the self-diagnosis of the motor, and determines whether there is the lock abnormality based on the characteristic of the terminal voltage during the OFF time period. The motor rotates inertially and the terminal voltage is generated due to an inducted voltage during the OFF time period when the lock abnormality has not occurred, while the motor does not rotate inertially and the terminal voltage is not generated during the OFF time period when the lock abnormality has occurred. Therefore, whether there is the lock abnormality can be determined by monitoring the characteristic of the terminal voltage during the OFF time period. Then, the rotational frequency of the motor should increase to achieve a somewhat high rotational frequency during an ON time period to generate a difference, which allows the brake apparatus to determine whether there is the lock abnormality, in the characteristic of the terminal voltage between under a normal condition and under an abnormal condition. At this time, turning on the motor at the on-duty ratio of 100% leads to an increase in motor drive noise, thereby undesirably causing a passenger to feel uncomfortable. Therefore, the conventional brake apparatus drives the motor at a lower on-duty ratio than 100% for a predetermined time period. Then, only when the lock abnormality is not determined to be absent at the time of an end of this driving, the brake apparatus determines whether there is the lock abnormality by driving the motor at the on-duty ratio of 100% for a predetermined time period. This conventional technique can reduce the motor drive noise when a battery voltage is high or under an ordinary-temperature environment, but the motor drive noise increases when the voltage of the power source reduces or under a low-temperature environment in which the motor rotation is subjected to higher resistance than under the ordinary-temperature environment.

On the other hand, in the motor lock abnormality determination processing according to the first embodiment, the brake apparatus repeats the ON/OFF driving the plurality of times and drives the motor M in such a manner that the rotational frequency of the motor during the OFF time period does not fall to zero and the peak of the rotational frequency of the motor during the ON time period increases as the ON/OFF driving is repeated. The above-described conventional technique starts the second ON/OFF driving (the on-duty ratio 100%) after the inertia rotation is stopped during the OFF time period in the first ON/OFF driving (the on-duty ratio is lower than 100%). Therefore, in the second ON/OFF driving, a sufficiently long time period should be prepared as the ON time period to increase the rotational frequency of the motor to the rotational frequency that allows the brake apparatus to determine whether there is the lock abnormality. Driving the motor at the on-duty ratio of 100% for a predetermined time period leads to generation of large motor drive noise. On the other hand, in the motor lock abnormality determination processing according to the first embodiment, the brake apparatus starts the next ON/OFF driving before the inertia rotation is stopped, and therefore can increase the peak of the rotational frequency of the motor during the ON time period as the ON/OFF driving is repeated, while reducing the ON time period in one ON/OFF driving operation compared to the conventional technique. At this time, the motor drive noise is intermittently generated, but the motor drive noise reduces as the ON time period reduces even when the on-duty ratio is 100%, so that the brake apparatus can operate with lower drive noise than the conventional technique. Further, the brake apparatus according to the first embodiment determines whether there is the lock abnormality while increasing the peak of the rotational frequency of the motor little by little each time the ON/OFF driving is carried out, and therefore can increase the rotational frequency of the motor to the rotational frequency that allows the brake apparatus to determine whether there is the lock abnormality while preventing each ON time period from increasing and keeping a minimum required number of times of motor driving even when the voltage of the power source reduces or under the low-temperature environment. Therefore, in the motor lock abnormality determination processing according to the first embodiment, the brake apparatus can reduce the motor drive noise at the time of the self-diagnosis of the motor M regardless of the condition.

Now, under the low-temperature environment, the brake fluid becomes highly viscous and the rotation of the motor M is subjected to higher resistance than under the ordinary-temperature environment. Therefore, even when the motor is not locked, the rotational frequency of the motor may fall to zero in the predetermined OFF time period and the peak of the rotational frequency of the motor may fail to increase. Therefore, in the motor lock abnormality determination processing according to the first embodiment, the brake apparatus gradually increases the ON time period according to the increase in the number of times of motor driving. Due to this operation, the brake apparatus can reliably determine whether there is the lock abnormality regardless of the condition.

The first embodiment brings about the following advantageous effects.

(1) The brake apparatus includes the hydraulic unit HU and the brake control unit BCU. The hydraulic unit HU includes the pump P configured to generate the brake hydraulic pressure for the brake actuation unit BU mounted at each of the wheels FL to RR, and the motor M configured to rotationally drive the pump P. The brake control unit BCU includes the drive instruction portion 22a configured to repeat the ON/OFF driving the plurality of times and drive the motor M in such a manner that the rotational frequency of the motor during the OFF time period does not fall to zero and the peak of the rotational frequency of the motor during the ON time period increases as the ON/OFF driving is repeated, the terminal voltage detection portion 22b configured to detect the terminal voltage of the motor M at the time of the ON/OFF driving carried out by the drive instruction portion 22a, and the motor lock abnormality determination portion 22c configured to determine whether there is the lock abnormality in the motor M based on the characteristic of the terminal voltage during the OFF time period of the ON/OFF driving that is detected by the terminal voltage detection portion 22b.

Therefore, the brake apparatus can reduce the motor drive noise at the time of the self-diagnosis of the motor independently of the condition and with the minimum required number of times of the ON/OFF driving.

(2) The motor lock abnormality determination portion 22c determines whether there is the lock abnormality based on whether the terminal voltage during the OFF time period of the ON/OFF driving that is detected by the terminal voltage detection portion 22b is higher than the predetermined threshold value.

Therefore, the brake apparatus can determine whether there is the lock abnormality in the motor based on the absolute value of the terminal voltage of the motor M.

(3) The motor lock abnormality determination portion 22c starts determining whether there is the lock abnormality during the OFF time period of the ON/OFF driving carried out for the second time by the drive instruction portion 22a.

At the first ON/OFF driving, the rotational frequency of the motor reaches only a low peak, which may lead to a failure to generate the terminal voltage that allows the brake apparatus to determine whether there is the lock abnormality. Therefore, the brake apparatus can improve the determination accuracy by starting determining whether there is the lock abnormality from the second ON/OFF driving.

(4) The motor lock abnormality determination portion 22c determines that there is the lock abnormality if not determining that there is not the lock abnormality even after the ON/OFF driving carried out by the drive instruction portion 22a is repeated as many times as the upper limit.

Therefore, the brake apparatus can prevent or cut down an unnecessary increase in the number of times of the ON/OFF driving, thereby reducing a time taken to determine whether there is the lock abnormality.

(5) The brake control method is the method for controlling the brake apparatus including the pump P configured to generate the brake hydraulic pressure for the brake actuation unit BU mounted at each of the wheels FL to RR and configured to be rotationally driven by the motor M. The brake control method includes issuing the drive instruction to repeat the ON/OFF driving and drive the motor M in such a manner that the rotational frequency of the motor during the OFF time period does not fall to zero and the peak of the rotational frequency of the motor during the ON time period increases as the ON/OFF driving is repeated (S2 and S5), carrying out terminal voltage detection to detect the terminal voltage of the motor M at the time of the ON/OFF driving carried out by the issuing of the drive instruction (S9), and determining the lock abnormality in the motor to determine whether there is the lock abnormality based on the characteristic of the terminal voltage during the OFF time period of the ON/OFF driving that is detected by the carrying out of the terminal voltage detection (S10 and S12).

Therefore, the brake control method can reduce the motor drive noise at the time of the self-diagnosis of the motor independently of the condition and with the minimum required number of times of the ON/OFF driving.

(6) The determining of the lock abnormality in the motor includes determining whether there is the lock abnormality based on whether the terminal voltage during the OFF time period of the ON/OFF driving that is detected by the carrying out of the terminal voltage detection is higher than the predetermined threshold value.

Therefore, the brake control method can determine whether there is the lock abnormality in the motor based on the absolute value of the terminal voltage of the motor M.

(7) The determining of the lock abnormality in the motor includes starting determining whether there is the lock abnormality during the OFF time period of the ON/OFF driving carried out for the second time by the issuing of the drive instruction.

At the first ON/OFF driving, the rotational frequency of the motor reaches only a low peak, which may lead to a failure to generate the terminal voltage that allows the brake control method to determine whether there is the lock abnormality. Therefore, the brake control method can improve the determination accuracy by starting determining whether there is the lock abnormality from the second ON/OFF driving.

(8) The determining of the lock abnormality in the motor includes determining that there is the lock abnormality if it is not determined that there is not the lock abnormality even after the ON/OFF driving carried out by the issuing of the drive instruction is repeated as many times as the upper limit.

Therefore, the brake control method can prevent or cut down the unnecessary increase in the number of times of the ON/OFF driving, thereby reducing the time taken to determine whether there is the lock abnormality.

(9) The method for determining the abnormality in the motor includes issuing the drive instruction to repeat the ON/OFF driving the plurality of times and drive the motor M in such a manner that the rotational frequency of the motor during the OFF time period does not fall to zero and the peak of the rotational frequency of the motor during the ON time period increases as the ON/OFF driving is repeated (S2 and S5), carrying out the terminal voltage detection to detect the terminal voltage of the motor M at the time of the ON/OFF driving carried out by the issuing of the drive instruction (S9), and determining the lock abnormality in the motor to determine whether there is the lock abnormality based on the characteristic of the terminal voltage during the OFF time period of the ON/OFF driving that is detected by the carrying out of the terminal voltage detection (S10 and S12).

Therefore, the method for controlling the abnormality in the motor can reduce the motor drive noise at the time of the self-diagnosis of the motor independently of the condition and with the minimum required number of times of the ON/OFF driving.

Second Embodiment

Next, a second embodiment will be described. The second embodiment has a basic configuration similar to the first embodiment, and therefore will be described focusing on only differences therefrom.

[Motor Lock Abnormality Determination Processing]

Figure 7:
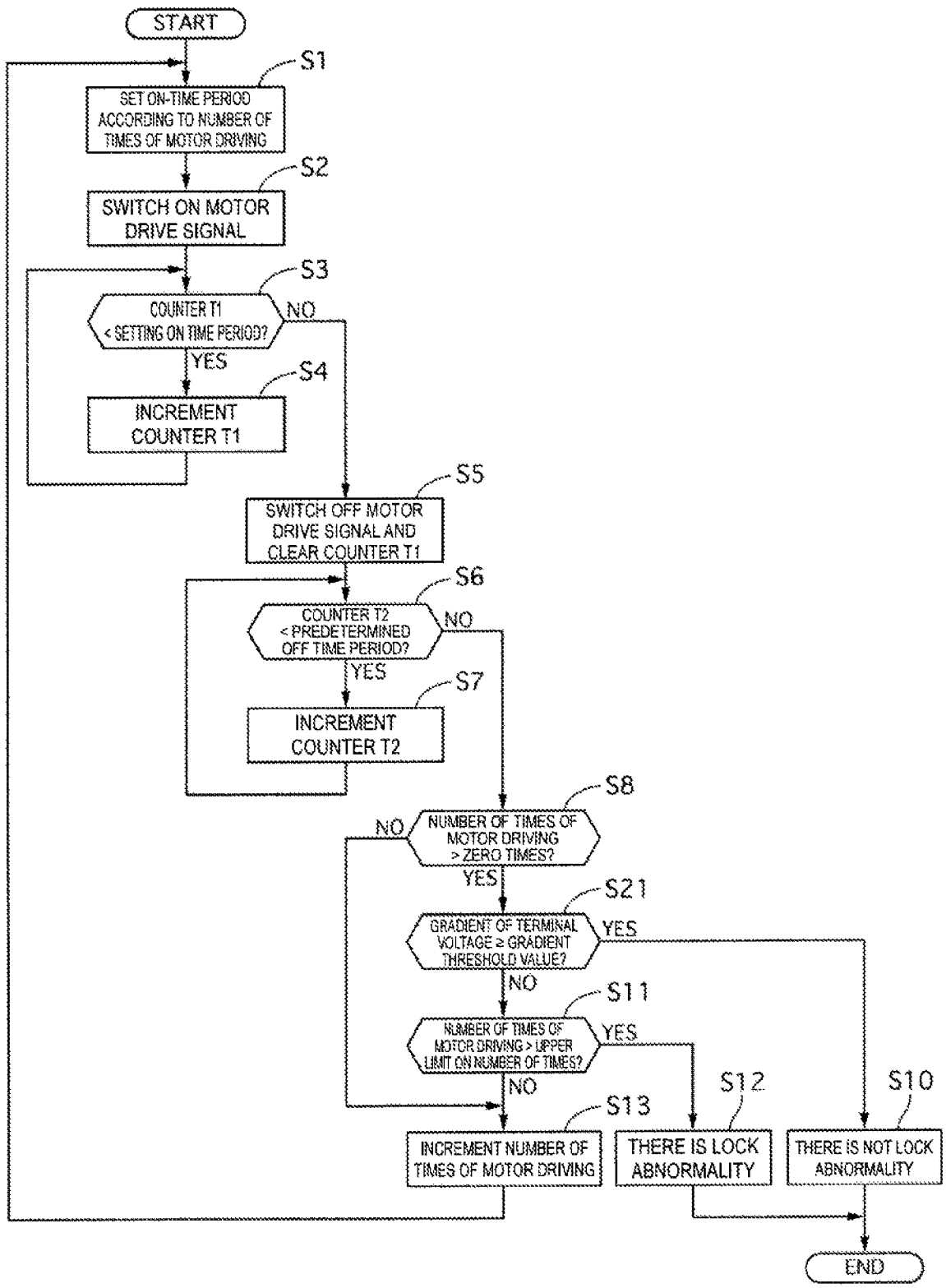
FIG. 7 is a flowchart illustrating a flow of motor lock abnormality determination processing according to a second embodiment.

FIG. 7 is a flowchart illustrating a flow of motor lock abnormality determination processing according to a second embodiment. This flow will be described, identifying steps in which similar processing to FIG. 4 is performed by the same step numbers, and omitting descriptions thereof.

In step S5, the drive instruction portion 22a stops the output of the motor drive signal, and the motor lock abnormality determination portion 22c clears the counter T1. At the same time as that, the terminal voltage detection portion 22b calculates the terminal voltage from the absolute value of the difference between the voltage of the high-side terminal and the voltage of the low-side terminal of the motor M. Then, the processing proceeds to step S6.

In step S21, the terminal voltage detection portion 22b calculates the terminal voltage from the absolute value of the difference between the voltage of the high-side terminal and the voltage of the low-side terminal of the motor M and calculates a reduction gradient (slope) of the terminal voltage from the calculated terminal voltage and the terminal voltage calculated in step S5. Along therewith, the motor lock abnormality determination portion 22c determines whether the gradient of the terminal voltage is equal to or larger than a gradient threshold value. If the determination in step S21 is YES, the processing proceeds to step S10. If the determination in step S21 is NO, the processing proceeds to step S11. Step S9 is a step of carrying out the terminal voltage detection.

The operation of the motor lock abnormality determination processing according to the second embodiment is similar to the first embodiment illustrated in FIGS. 5 and 6 except for determining whether there is the lock abnormality by comparing the reduction gradient of the terminal voltage and the gradient threshold value, and therefore illustration and a description thereof will be omitted here.

The second embodiment brings about the following advantageous effect.

(10) The motor lock abnormality determination portion 22c determines whether there is the lock abnormality based on whether the change rate of the terminal voltage during the OFF time period of the ON/OFF driving that is detected by the terminal voltage detection portion 22b is higher than the predetermined change rate.

Therefore, the brake apparatus can determine whether there is the lock abnormality in the motor based on the change rate of the terminal voltage of the motor M.

Third Embodiment

Next, a third embodiment will be described. The third embodiment has a basic configuration similar to the first embodiment, and therefore will be described focusing on only differences therefrom.

Figure 8:
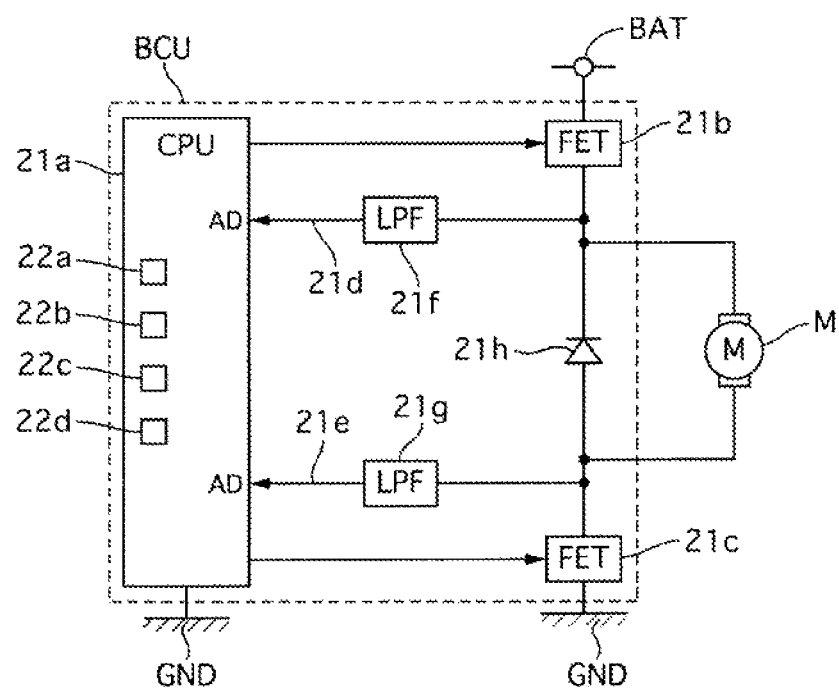
FIG. 8 illustrates a configuration of a motor drive circuit according to a third embodiment.

FIG. 8 illustrates a configuration of a motor drive circuit according to the third embodiment.

The CPU 21a of the brake control unit BCU performs motor electric abnormality determination processing at the same time as starting the motor lock abnormality determination processing to determine whether there is an electric abnormality in the motor M. The CPU 21a includes a motor electric abnormality determination portion 22d.

[Motor Lock Abnormality Determination Processing]

The motor lock abnormality determination processing according to the third embodiment is approximately similar to the first embodiment illustrated in FIG. 4, but is different from the first embodiment in terms of the predetermined OFF time period in step S6. The predetermined OFF time period is set to the same time period as the first embodiment (for example, 5 msec) when the number of times of motor driving is once or more. When the number of times of motor driving is zero times, the predetermined OFF time period is set to a longer time period (for example, 15 msec) than when the number of times of motor driving is once or more than. Further, in the third embodiment, the brake control unit BCU is configured to cancel the motor abnormality determination processing and refrain from determining whether there is the lock abnormality when determining that there is the electric abnormality in the motor electric abnormality determination processing.

[Motor Electric Abnormality Determination Processing]

Figure 9:
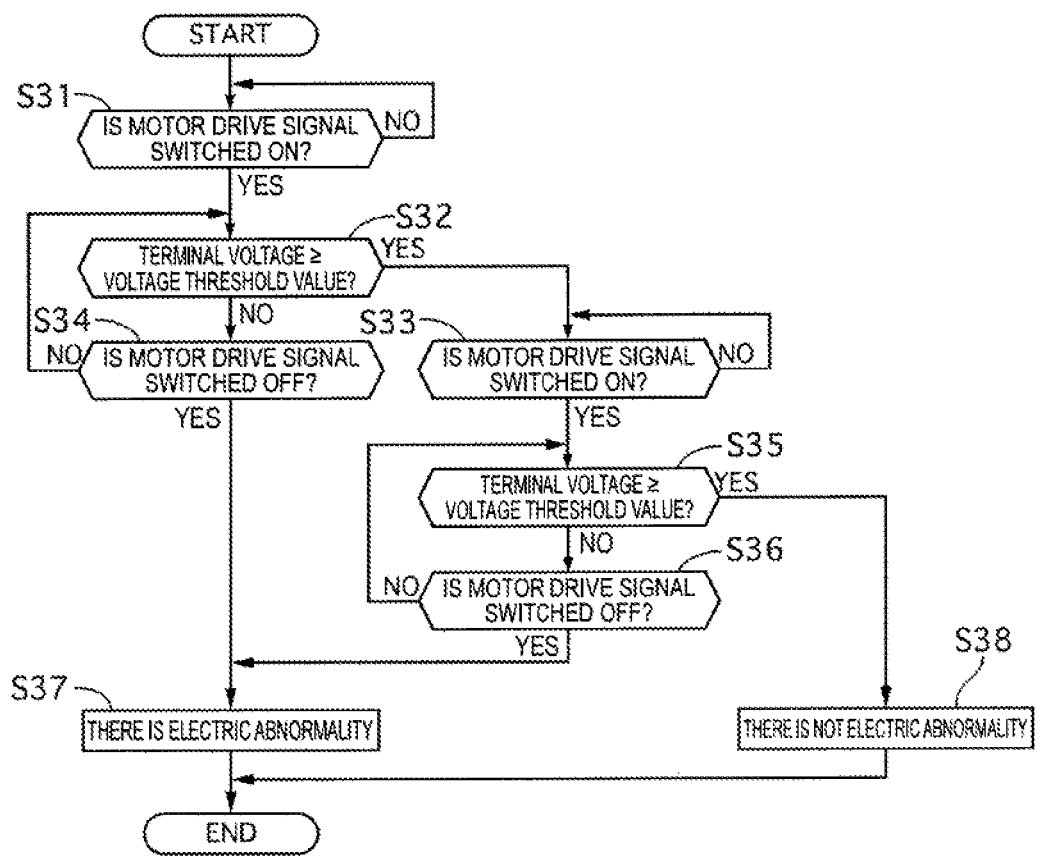
FIG. 9 is a flowchart illustrating a flow of the motor electric abnormality determination processing according to the third embodiment.

FIG. 9 is a flowchart illustrating a flow of the motor electric abnormality determination processing according to the third embodiment. The motor electric abnormality determination processing is started at the same time as the motor lock abnormality determination processing.

In step S31, the motor electric abnormality determination portion 22d determines whether the motor drive signal is switched on. If the determination in step S31 is YES, the processing proceeds to step S32. If the determination in step S31 is NO, step S31 is repeated.

In step S32, the terminal voltage detection portion 22b calculates the terminal voltage from the absolute value of the difference between the voltage of the high-side terminal and the voltage of the low-side terminal of the motor M, and the motor electric abnormality determination portion 22d determines whether the terminal voltage is equal to or higher than an electric check voltage threshold value. If the determination in step S32 is YES, the processing proceeds to step S33. If the determination in step S32 is NO, the processing proceeds to step S34.

In step S33, the motor electric abnormality determination portion 22d determines whether the motor drive signal is switched on. If the determination in step S33 is YES, the processing proceeds to step S35. If the determination in step S33 is NO, step S33 is repeated.

In step S34, the motor electric abnormality determination portion 22d determines whether the motor drive signal is switched off. If the determination in step S34 is YES, the processing proceeds to step S37. If the determination in step S34 is NO, the processing returns to step S32.

In step S35, the terminal voltage detection portion 22b calculates the terminal voltage from the absolute value of the difference between the voltage of the high-side terminal and the voltage of the low-side terminal of the motor M, and the motor electric abnormality determination portion 22d determines whether the terminal voltage is equal to or higher than the electric check voltage threshold value. If the determination in step S35 is YES, the processing proceeds to step S38. If the determination in step S35 is NO, the processing proceeds to step S36.

In step S36, the motor electric abnormality determination portion 22d determines whether the motor drive signal is switched off. If the determination in step S36 is YES, the processing proceeds to step S37. If the determination in step S36 is NO, the processing returns to step S35.

In step S37, the motor electric abnormality determination portion 22d determines that "there is the electric abnormality". Then, the motor electric abnormality determination processing is ended.

In step S38, the motor electric abnormality determination portion 22d determines that "there is not the electric abnormality". Then, the motor electric abnormality determination, processing is ended.

Next, operations of the motor lock abnormality determination processing and the motor electric abnormality determination processing according to the third embodiment will be described.

(Under Normal Condition)

Figure 10:
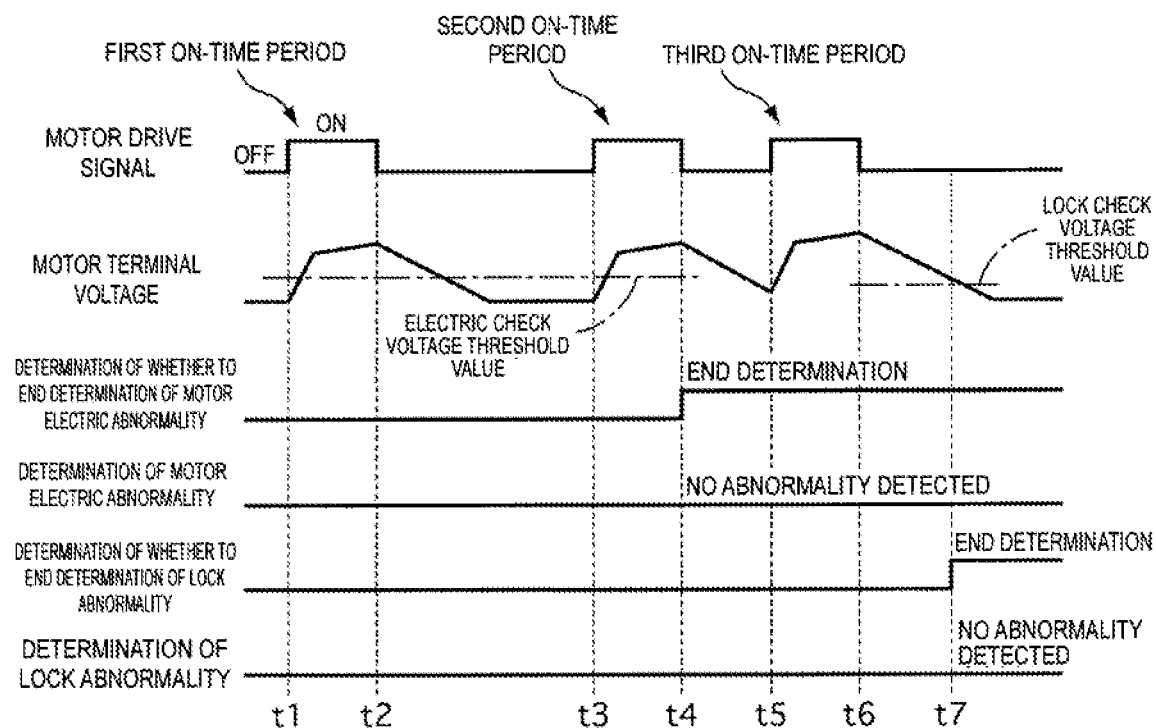
FIG. 10 is a timing chart illustrating operations when a motor electric abnormality has not occurred in the motor lock abnormality determination processing and the motor electric abnormality determination processing according to the third embodiment.

FIG. 10 is a timing chart illustrating the operations when the motor electric abnormality has not occurred in the motor lock abnormality determination processing and the motor electric abnormality determination processing according to the third embodiment. Assume that the motor lock has neither occurred.

At time t1, the CPU 21a turns on the motor M to start the first ON/OFF driving. Since there is not the electric abnormality in the motor M, the terminal voltage increases during a time period from time t1 to time t2. Further, since the motor M is not locked, the rotational frequency of the motor also increases according to the increase in the terminal voltage. During the time period from t1 to t2, because the terminal voltage exceeds the electric check voltage threshold value, the motor lock abnormality determination processing is continued.

At time t2, the CPU 21a turns off the motor M because the setting ON time period has elapsed from time t1. During a time period from time t2 to time t3, the terminal voltage also reduces according to the reduction in the rotational frequency of the motor.

At time t3, the CPU 21a turns on the motor M to start the second ON/OFF driving because the predetermined OFF time period has elapsed from time t2. During a time period from time t3 to time t4, because the terminal voltage exceeds the electric check voltage threshold value, the CPU 21a determines that there is not the electric abnormality and ends the motor electric abnormality determination processing. According to the determination that there is not the electric abnormality, the motor lock determination processing is continued.

At time t4, the CPU 21a turns off the motor M because the setting ON time period has elapsed from time t3. During a time period from time t4 to time t5, the terminal voltage also reduces according to the reduction in the rotational frequency of the motor.

At time t5, the CPU 21a determines whether there is the motor lock abnormality by comparing the terminal voltage and the lock check voltage threshold value because the predetermined OFF time period has elapsed from time t4. At this time, because the terminal voltage, is lower than the lock check voltage threshold value, the CPU 21a turns on the motor M to start the third ON/OFF driving.

At time t6, the CPU 21a turns off the motor M because the setting ON time period has elapsed from time t5.

At time t7, the CPU 21a determines whether there is the motor lock abnormality by comparing the terminal voltage and the lock check voltage threshold value because the predetermined OFF time period has elapsed from time t6. At this time, the terminal voltage is higher than the lock check voltage threshold value, and therefore the CPU 21a determines that there is not the motor lock abnormality and ends the motor lock abnormality determination processing.

(Under Abnormal Condition)

Figure 11:
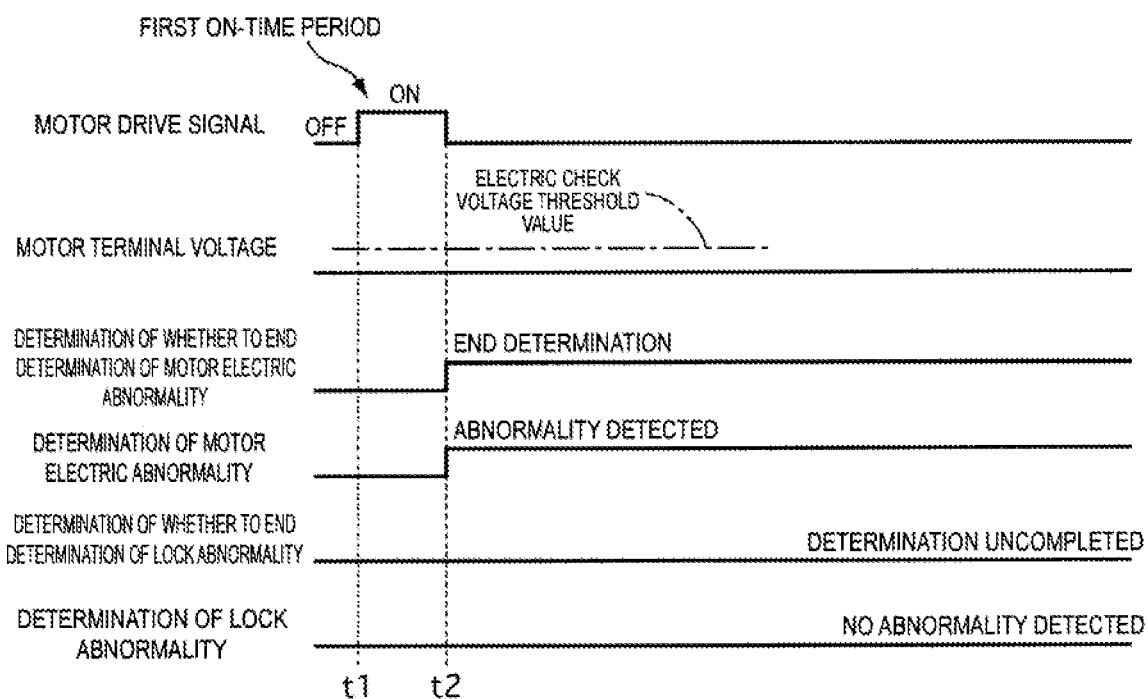
FIG. 11 is a timing chart illustrating operations when the motor electric abnormality has occurred in the motor lock abnormality determination processing and the motor electric abnormality determination processing according to the third embodiment.

FIG. 11 is a timing chart illustrating the operations when the motor electric abnormality has occurred in the motor lock abnormality determination processing and the motor electric abnormality determination processing according to the third embodiment.

At time t1, the CPU 21a turns on the motor M to start the first ON/OFF driving. Since the electric abnormality has occurred in the motor M, the terminal voltage remains zero during the time period from time t1 to time t2.

At time t2, the CPU 21a turns off the motor M because the setting ON time period has elapsed from time t1. Because the terminal voltage has not reached the electric check voltage threshold value during the first ON time period, the CPU 21a determines that there is the electric abnormality and ends the motor electric abnormality determination processing. According to the determination that there is the electric abnormality, the motor lock determination processing is also ended.

In the third embodiment, the brake apparatus determines whether there is the motor electric abnormality based on the terminal voltage at the time of the first ON/OFF driving in which whether there is the look abnormality is not determined. If the motor electric abnormality has occurred, the terminal voltage is not generated after the OFF time period. Therefore, the brake apparatus can prevent or reduce an erroneous determination that mistakes the occurrence of the motor electric abnormality for the lock abnormality by determining whether there is the motor electric abnormality before determining whether there is the lock abnormality. Further, the brake apparatus can prevent the erroneous determination that mistakes the occurrence of the motor electric abnormality for the lock abnormality by stopping determining whether there is the lock abnormality if determining that there is the motor electric abnormality. Further, the brake apparatus can use the first ON/OFF driving to determine whether there is the motor electric abnormality. Further, the brake apparatus can improve the reliability of the determination by also determining whether there is the motor electric abnormality at the time of the second ON/OFF driving.

The third embodiment brings about the following advantageous effects.

(11) The brake control unit BUC further includes the motor electric abnormality determination portion 22d configured to determine whether there is the electric abnormality in the motor M based on the terminal voltage during the ON time period of the ON/OFF driving carried out for the first time by the drive instruction portion 22a.

Therefore, the brake apparatus can use the first ON/OFF driving, in which whether there is the lock abnormality is not determined, to determine whether there is the electric abnormality. Further, the brake apparatus can prevent or reduce the erroneous determination about whether there is the lock abnormality.

(12) The motor lock abnormality determination portion 22c stops determining whether there is the lock abnormality if the motor electric abnormality determination portion 22d determines that there is the electric abnormality.

Therefore, the brake apparatus can prevent or reduce the erroneous determination that mistakes the occurrence of the electric abnormality in the motor for the lock abnormality.

Other Embodiments

Having described the embodiments of the present invention, the specific configuration of the present invention is not limited to the configurations described in the embodiments, and the present invention also includes a design modification and the like thereof made within a range that does not depart from the spirit of the present invention. Further, the individual components described in the claims and the specification can be arbitrarily combined or omitted within a range that allows them to remain capable of achieving at least a part of the above-described objects or producing at least a part of the above-described advantageous effects.

The on-duty ratio may be lower than 100% as long as the motor can be driven in such a manner that the peak of the rotational frequency of the motor increases as the ON/OFF driving is repeated, when the ON/OFF driving is repeated the plurality of times.

The number of times of motor driving may be any number as long as it is plural.

The setting ON time period of the motor may be kept constant without varying according to the number of times of motor driving. Further, the brake apparatus may measure an outside air temperature or a temperature of the brake fluid, and increase the setting ON time period as the ON/OFF driving is repeated, only when the outside air temperature or the temperature of the brake fluid falls below a low-temperature determination threshold value.

The determination about whether there is the lock abnormality and the determination about whether there is the electric abnormality may be made in parallel with each other.

In the following description, technical ideas recognizable from the above-described embodiments will be described.

A brake apparatus, according to one aspect thereof, includes a hydraulic unit and a control unit. The hydraulic unit includes a pump configured to generate a brake hydraulic pressure for a braking force generation portion mounted at a wheel, and a motor configured to rotationally drive the pump. The control unit includes a drive instruction portion configured to repeat ON/OFF driving a plurality of times and drive the motor in such a manner that a rotational frequency of the motor during an OFF time period does not fall to zero and a peak of the rotational frequency of the motor during an ON time period increases as the ON/OFF driving is repeated, a terminal voltage detection portion configured to detect a terminal voltage of the motor at the time of the ON/OFF driving carried out by the drive instruction portion, and a motor lock abnormality determination portion configured to determine whether there is a lock abnormality in the motor based on a characteristic of the terminal voltage during the OFF time period of the ON/OFF driving that is detected by the terminal voltage detection portion.

According to a more preferable aspect, in the above-described aspect, the motor lock abnormality determination portion determines whether there is the lock abnormality based on whether the terminal voltage during the OFF time period of the ON/OFF driving that is detected by the terminal voltage detection portion is higher than a predetermined threshold value.

According to another preferable aspect, in any of the above-described aspects, the motor lock abnormality determination portion starts determining whether there is the lock abnormality during the OFF time period of the ON/OFF driving carried out for the second time by the drive instruction portion.

According to further another preferable aspect, in any of the above-described aspects, the motor lock abnormality determination portion determines that there is the lock abnormality if not determining that there is not the lock abnormality even after the ON/OFF driving carried out by the drive instruction portion is repeated of the predetermined times.

According to further another preferable aspect, in any of the above-described aspects, the control unit further includes a motor electric abnormality determination portion configured to determine whether there is an electric abnormality in the motor based on the terminal voltage during the ON time period of the ON/OFF driving carried out for the first time by the drive instruction portion.

According to further another preferable aspect, in any of the above-described aspects, the motor lock abnormality determination portion stops determining whether there is the lock abnormality if the motor electric abnormality determination portion determines that there is the electric abnormality.

According to further another preferable aspect, in any of the above-described aspects, the motor electric abnormality determination portion also determines whether there is the electric abnormality during the ON time period of the ON/OFF driving carried out for the second time by the drive instruction portion.

According to further another preferable aspect, in any of the above-described aspects, the motor lock abnormality determination portion determines whether there is the lock abnormality based on whether a change rate of the terminal voltage during the OFF time period of the ON/OFF driving that is detected by the terminal voltage detection portion is higher than a predetermined change rate.

Further, from another point of view, a brake control method, according to one aspect, is a method for controlling a brake apparatus including a pump configured to generate a brake hydraulic pressure for a braking force generation portion mounted at a wheel and configured to be rotationally driven by a motor. The brake control method includes issuing a drive instruction to repeat ON/OFF driving a plurality of times and drive the motor in such a manner that a rotational frequency of the motor during an OFF time period does not fall to zero and a peak of the rotational frequency of the motor during an ON time period increases as the ON/OFF driving is repeated, carrying out terminal voltage detection to detect a terminal voltage of the motor at the time of the ON/OFF driving carried out by the issuing of the drive instruction, and determining a lock abnormality in the motor to determine whether there is the lock abnormality based on a characteristic of the terminal voltage during the OFF time period of the ON/OFF driving that is detected by the carrying out of the terminal voltage detection.

Preferably, in the above-described aspect, the determining of the lock abnormality in the motor includes determining whether there is the lock abnormality based on whether the terminal voltage during the OFF time period of the ON/OFF driving that is detected by the carrying out of the terminal voltage detection is higher than a predetermined threshold value.

According to another preferable aspect, in any of the above-described aspects, the determining of the lock abnormality in the motor includes starting determining whether there is the lock abnormality during the OFF time period of the ON/OFF driving carried out for the second time by the issuing of the drive instruction.

According to another preferable aspect, in any of the above-described aspects, the determining of the lock abnormality in the motor includes determining that there is the lock abnormality if it is not determined that there is not the lock abnormality even after the ON/OFF driving carried out by the issuing of the drive instruction is repeated the plurality of times.

According to further another preferable aspect, in any of the above-described aspects, the brake control method further includes determining an electric abnormality in the motor to determine whether there is the electric abnormality in the motor based on the terminal voltage during the ON time period of the ON/OFF driving carried out for the first time by the issuing of the drive instruction.

According to further another preferable aspect, in any of the above-described aspects, the determining of the lock abnormality in the motor includes stopping determining whether there is the lock abnormality if it is determined that there is the electric abnormality by the determining of the electric abnormality in the motor.

According to further another preferable aspect, in any of the above-described aspects, the determining of the electric abnormality in the motor includes also determining whether there is the electric abnormality during the ON time period of the ON/OFF driving carried out for the second time by the issuing of the drive instruction.

According to further another preferable aspect, in any of the above-described aspects, the determining of the lock abnormality in the motor includes determining whether there is the lock abnormality based on whether a change rate of the terminal voltage during the OFF time period of the ON/OFF driving that is detected by the carrying out of the terminal voltage detection is higher than a predetermined change rate.

Further, from another point of view, a method for determining a lock abnormality in a motor, according to one aspect, includes issuing a drive instruction to repeat ON/OFF driving a plurality of times and drive the motor in such a manner that a rotational frequency of the motor during an OFF time period does not fall to zero and a peak of the rotational frequency of the motor during an ON time period increases as the ON/OFF driving is repeated, carrying out terminal voltage detection to detect a terminal voltage of the motor at the time of the ON/OFF driving carried out by the issuing of the drive instruction, and determining the lock abnormality in the motor to determine whether there is the lock abnormality based on a characteristic of the terminal voltage during the OFF time period of the ON/OFF driving that is detected by the carrying out of the terminal voltage detection.

Preferably, in the above-described aspect, the determining of the lock abnormality in the motor includes determining whether there is the lock abnormality based on whether the terminal voltage during the OFF time period of the ON/OFF driving that is detected by the carrying out of the terminal voltage detection is higher than a predetermined threshold value.

According to further another preferable aspect, in any of the above-described aspects, the determining of the lock abnormality in the motor includes starting determining whether there is the lock abnormality during the OFF time period of the ON/OFF driving carried out for the second time by the issuing of the drive instruction.

According to further another preferable aspect, in any of the above-described aspects, the determining of the lock abnormality in the motor includes determining that there is the lock abnormality if it is not determined that there is not the lock abnormality even after the ON/OFF driving carried out by the issuing of the drive instruction is repeated the predetermined times.

The present application claims priority to Japanese Patent Application No. 2016-55818 filed on Mar. 18, 2016. The entire disclosure of Japanese Patent Application No. 2016-55818 filed on Mar. 18, 2016 including the specification, the claims, the drawings, and the abstract is incorporated herein by reference in its entirety.

REFERENCE SIGN LIST

BCU brake control unit (control unit)
BU brake actuation unit (braking force generation portion)
FL to RR wheel
HU hydraulic unit
M motor
P oil pump (pump)
22a drive instruction portion
22b terminal voltage detection portion
22c motor lock abnormality determination portion
22d motor electric abnormality determination portion

The invention claimed is:
1. A brake apparatus comprising:
a hydraulic circuit; and
a controller,
the hydraulic circuit including
a pump configured to generate a brake hydraulic pressure for a braking force generator mounted at a wheel, and
a motor configured to rotationally drive the pump,
the controller being configured to
repeat ON/OFF driving a plurality of times and drive the motor such that rotational frequency of the motor corresponding to speed of the motor during an OFF time period does not fall to zero and a peak of the rotational frequency of the motor during an ON time period increases as the ON/OFF driving is repeated,
detect a terminal voltage of the motor at the time of the ON/OFF driving, and
determine whether there is a lock abnormality in the motor based on a whether the detected terminal voltage after a predetermined time period has elapsed since the ON/OFF driving is repeated the plurality of times and the motor is switched off is greater than a predetermined threshold,
wherein the controller is configured to repeat the ON/OFF driving the plurality of times prior to determining whether there is a lock abnormality.
2. The brake apparatus according to claim 1, wherein the controller is configured to start determining whether there is the lock abnormality during the OFF time period of the ON/OFF driving carried out for the second time.

3. The brake apparatus according to claim 2, wherein the controller is configured to determine that there is the lock abnormality if not determining that there is not the lock abnormality even after the ON/OFF driving is repeated the plurality of times.

4. The brake apparatus according to claim 3, wherein the controller is further configured to determine whether there is an electric abnormality in the motor based on the terminal voltage during the ON time period of the ON/OFF driving carried out for the first time.

5. The brake apparatus according to claim 4, wherein the controller is configured to stop determining whether there is the lock abnormality in response to determining that there is the electric abnormality.

6. The brake apparatus according to claim 4, wherein the controller is configured to determine whether there is the electric abnormality based on the terminal voltage during the ON time period of the ON/OFF driving carried out for the second time in addition to the terminal voltage during the ON time period of the ON/OFF driving carried out for the first time.

7. The brake apparatus according to claim 1, wherein the controller is configured to determine whether there is the lock abnormality based on whether a change rate of the detected terminal voltage during the OFF time period of the ON/OFF driving is higher than a predetermined change rate.

8. A brake control method for a brake apparatus including a pump configured to generate a brake hydraulic pressure for a braking force generator mounted at a wheel and configured to be rotationally driven by a motor, the brake control method comprising:
issuing a drive instruction to repeat ON/OFF driving a plurality of times and drive the motor such that a rotational frequency of the motor corresponding to speed of the motor during an OFF time period does not fall to zero and a peak of the rotational frequency of the motor during an ON time period increases as the ON/OFF driving is repeated;
carrying out terminal voltage detection to detect a terminal voltage of the motor at the time of the ON/OFF driving carried out by the issuing of the drive instruction; and
determining whether there is a lock abnormality in the motor based on whether the terminal voltage that is detected by the carrying out of the terminal voltage detection is higher than a predetermined threshold value after a predetermined time period has elapsed since the ON/OFF driving is repeated the plurality of times and the motor is switched off by the issuing of the drive instruction,
wherein the issuing of the drive instruction is performed prior to determining whether there is a lock abnormality by determining whether there is an electric abnormality in the motor.

9. The brake control method according to claim 8, wherein the determining of the lock abnormality in the motor includes starting determining whether there is the lock abnormality during the OFF time period of the ON/OFF driving carried out for the second time by the issuing of the drive instruction.

10. The brake control method according to claim 9, wherein the determining of the lock abnormality in the motor includes determining that there is the lock abnormality when it is not determined that the lock abnormality is not present even after the ON/OFF driving carried out by the issuing of the drive instruction is repeated the plurality of times.

11. The brake control method according to claim 10, further comprising determining whether there is the electric abnormality in the motor based on the terminal voltage during the ON time period of the ON/OFF driving carried out for the first time by the issuing of the drive instruction.

12. The brake control method according to claim 11, wherein the determining of the lock abnormality in the motor includes stopping determining whether there is the lock abnormality responsive to determining that there is the electric abnormality by the determining of the electric abnormality in the motor.

13. The brake control method according to claim 11, wherein the determining of the electric abnormality in the motor includes determining whether there is the electric abnormality based on the terminal voltage during the ON time period of the ON/OFF driving carried out for the second time by the issuing of the drive instruction in addition to the terminal voltage during the ON time period of the ON/OFF driving carried out for the first time.

14. The brake control method according to claim 8, wherein the determining of the lock abnormality in the motor includes determining whether there is the lock abnormality based on whether a change rate of the terminal voltage during the OFF time period of the ON/OFF driving that is detected by the carrying out of the terminal voltage detection is higher than a predetermined change rate.

15. A method for determining an abnormality in a motor, the method comprising:
issuing a drive instruction to repeat ON/OFF driving a plurality of times and drive the motor such that a rotational frequency of the motor corresponding to speed of the motor during an OFF time period does not fall to zero and a peak of the rotational frequency of the motor during an ON time period increases as the ON/OFF driving is repeated;
carrying out terminal voltage detection to detect a terminal voltage of the motor at the time of the ON/OFF driving carried out by the issuing of the drive instruction; and
determining whether there is a lock abnormality in the motor based on whether the terminal voltage that is detected by the carrying out of the terminal voltage detection is higher than a predetermined threshold value after a predetermined time period has elapsed since the ON/OFF driving is repeated the plurality of times and the motor is switched off by the issuing of the drive instruction,
wherein the issuing of the drive instruction is performed prior to being determined whether there is a lock abnormality by the determining of the electric abnormality in the motor.

16. The method for determining the abnormality in the motor according to claim 15, wherein the determining of the lock abnormality in the motor includes starting determining whether there is the lock abnormality during the OFF time period of the ON/OFF driving carried out for the second time by the issuing of the drive instruction.

17. The method for determining the abnormality in the motor according to claim 16, wherein the determining of the lock abnormality in the motor includes determining that there is the lock abnormality when it is not determined that the lock abnormality is not present even after the ON/OFF driving carried out by the issuing of the drive instruction is repeated the plurality of times.

* * * * *